Nov. 9, 1965  F. B. PERRY  3,216,596
TOWING APPARATUS FOR WHEELED VEHICLES
Filed May 9, 1963  2 Sheets-Sheet 1

INVENTOR
FRANCIS B. PERRY
BY BUCKHORN, BLORE,
KLARQUIST & SPARKMAN
ATTORNEYS

Nov. 9, 1965  F. B. PERRY  3,216,596
TOWING APPARATUS FOR WHEELED VEHICLES
Filed May 9, 1963  2 Sheets-Sheet 2
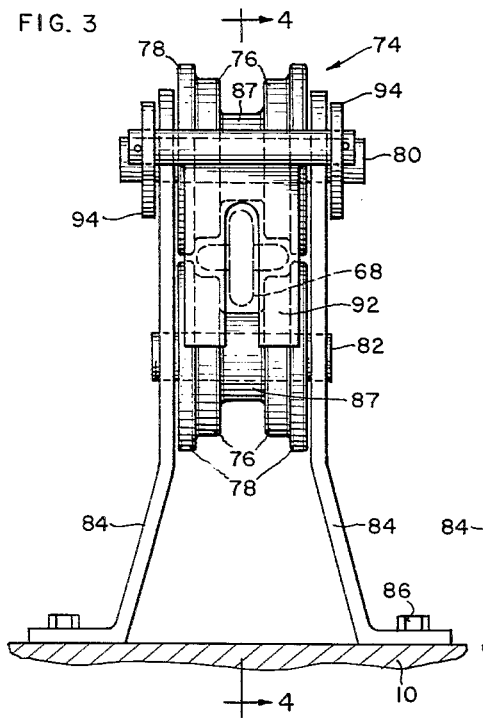
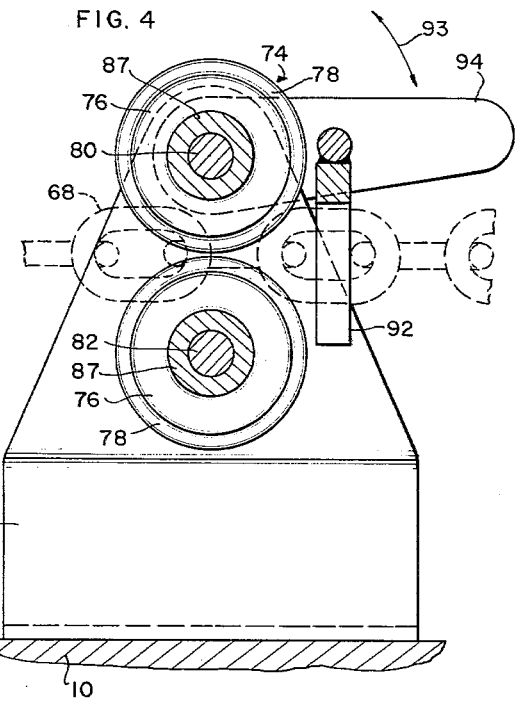
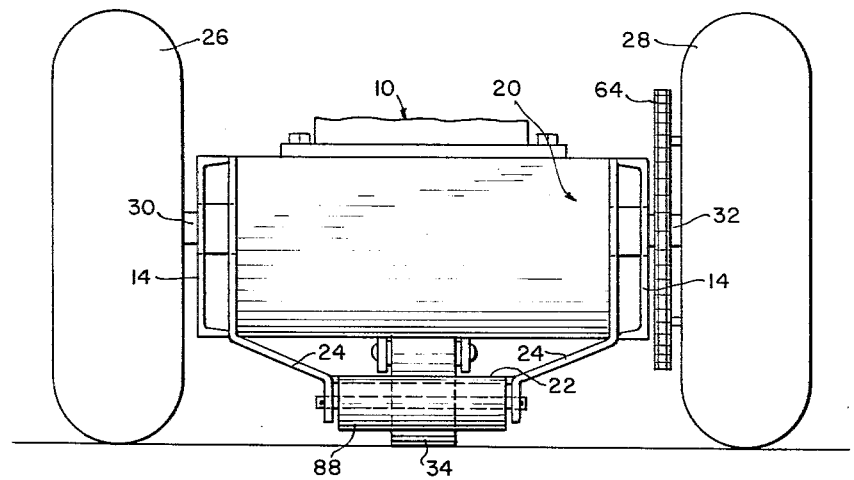
INVENTOR
FRANCIS B. PERRY
BY
BUCKHORN, BLORE,
KLARQUIST & SPARKMAN
ATTORNEYS United States Patent Office 3,216,596
Patented Nov. 9, 1965

3,216,596
TOWING APPARATUS FOR WHEELED VEHICLES
Francis B. Perry, 1129 23rd St., Longview, Wash.
Filed May 9, 1963, Ser. No. 279,114
2 Claims. (Cl. 214—85.1)

The subject matter of the present invention relates generally to towing apparatus, and in particular to a tug for moving wheeled vehicles, such as airplanes along the ground.

The towing apparatus of the present invention is especially useful for moving airplanes into and out of their hangers by pulling the nose wheel of airplanes having tricycle landing gears, or the tail wheel of airplanes having conventional landing gears, onto the towing apparatus by a manual powered loading device. The towing apparatus may be provided with a motor powered drive mechanism for the wheeled carriage of such apparatus so that one man can easily move a large airplane.

The present aircraft tug has several advantages over previous towing apparatus for airplanes, including a more simple construction which is less expensive to manufacture. Previous towing apparatus have employed complicated and expensive loading devices, such as hydraulic jacks, to lift the entire wheel assembly of the airplane up off the ground onto such apparatus. The aircraft tug of the present invention employs a simple manual operated loading device which rolls one wheel of the airplane up onto the tug carriage by means of a tow chain attached to such airplane and a pivoted carriage handle attached to such tow chain so that the handle functions as a lever. In addition, the aircraft tug is provided with a chain guide and locking device which guides the movement of the tow chain while the wheel of the airplane is being pulled up onto the tug carriage, and locks such chain in against movement when such wheel is on such carriage in towing position. This positive locking device prevents the wheel of the airplane from sliding off the tug carriage when such tug is moving. The present aircraft tug has other advantages over conventional towing apparatus including its small size and light weight construction which enable it to be loaded into the airplane and carried for use in remote areas having no modern airport facilities, such as those areas which are frequented by hunters and ranchers.

It is therefore one object of the present invention to provide an improved towing apparatus of simple and inexpensive construction.

Another object of the present invention is to provide an improved aircraft tug for moving airplanes which is of small size and light weight.

A further object of the invention is to provide an improved towing apparatus for wheeled vehicles in which a manually operated loading device is employed to roll one wheel of the vehicle onto such towing apparatus.

Still another object of the present invention is to provide an improved aircraft tug in which a chain guide and locking device are employed to guide the movement of a tow chain attached to a wheel of an airplane and for locking such chain against movement with such wheel in towing position on such tug to prevent such wheel from sliding off the tug during movement of such tug.

A still further object of the invention is to provide an improved loading device for an aircraft tug in which the steering handle for the tug is employed as a lever to pull one wheel of an airplane up onto the tug chassis by means of a tow chain attached to such wheel and extending through a guide to a releasable catch mounted on such handle so that loading may be easily accomplished by manually pivoting the handle about one end thereof to pull the tow line through the guide means.

Additional objects and advantages of the present invention will be apparent from the following detailed description of a preferred embodiment thereof and from the attached drawings from which:

FIG. 3 is an enlarged view taken along the line 3—3 of FIG. 2 showing the chain guide and lock mechanism of the tug;

FIG. 4 is a vertical sectional view taken along line 4—4 of FIG. 3; and

FIG. 5 is an enlarged sectional view taken along the line 5—5 of FIG. 2.

Figure 1:
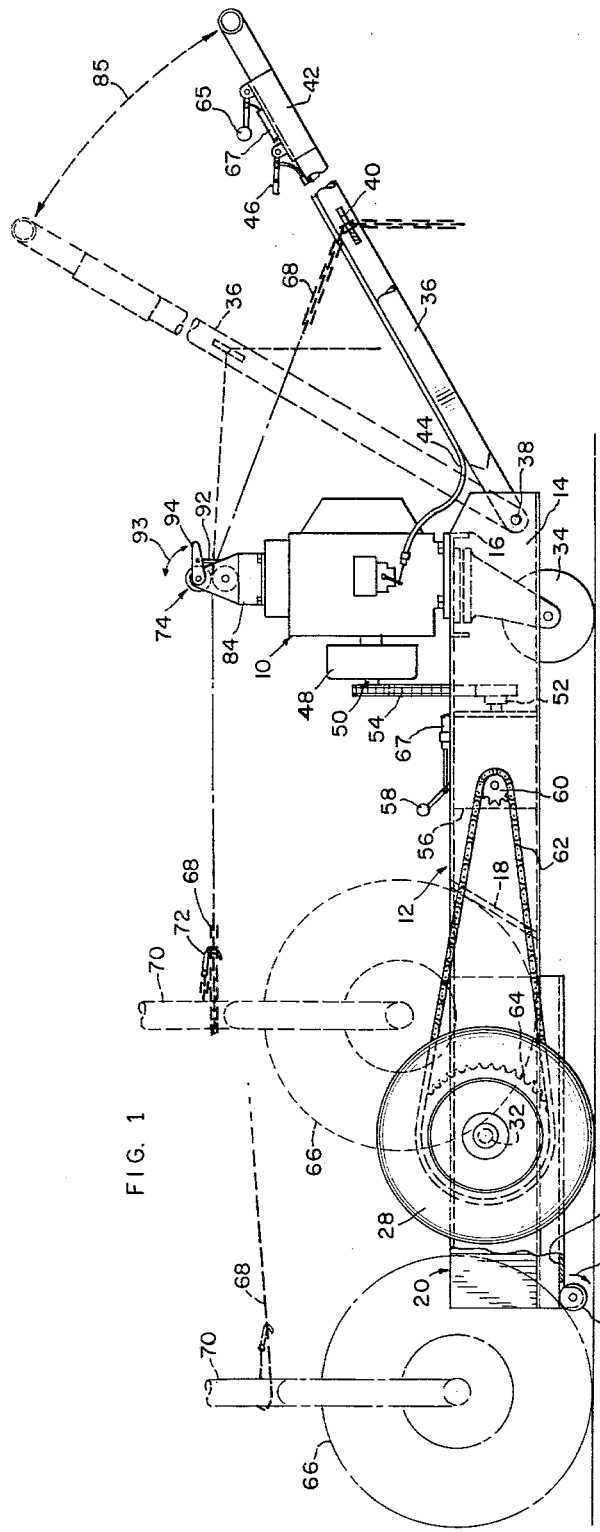
FIG. 1 is a side view of the aircraft tug of the present invention with parts broken away for clarity.
Figure 2:
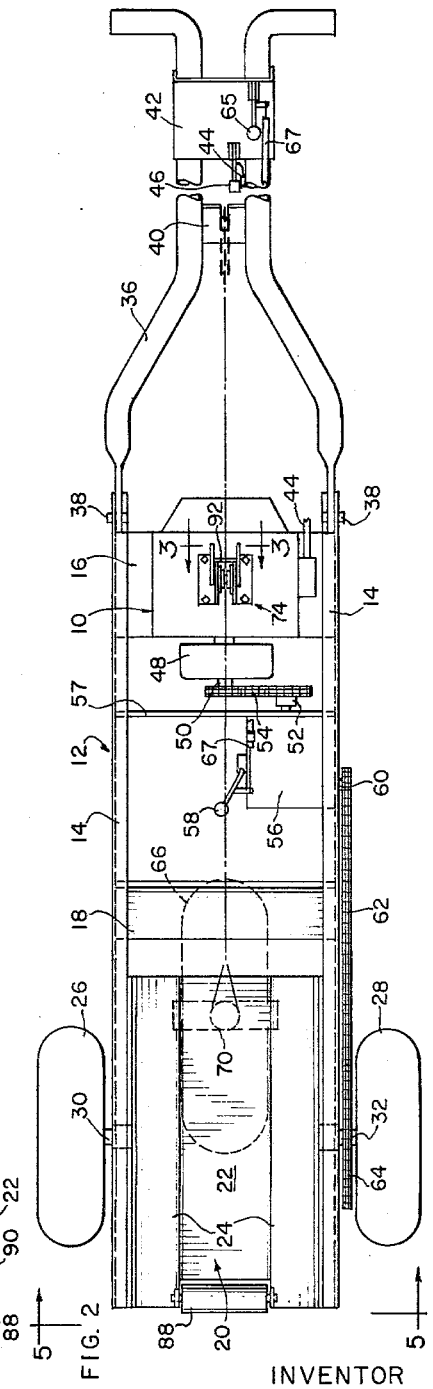
FIG. 2 is a plan view of the aircraft tug of FIG. 1.

As shown in FIGS. 1 and 2, the aircraft tug of the present invention may include an internal combustion engine 10 rigidly mounted on a chassis or frame 12 including a pair of substantially parallel side beams 14 in the form of U-shaped channels connected by a motor mounting plate 16, a stop plate 18 and a carrier pan 20 welded thereto. The carrier pan 20 is a tire receiving channel or trough container formed by a flat bottom portion 22 and a pair of inwardly slanting side portions 24 which hold one of the tires of the airplane to be moved by such tug. A pair of rubber tired rear wheels 26 and 28 are rotatably mounted on shafts 30 and 32, respectively, secured to the side beams 14 on opposite sides of the carrier pan. A caster wheel 34 is pivotally mounted on the lower side of the mounting plate 16 at the front end of frame 12 so that such caster wheel rotates freely through 360° on such mounting plate to enable steering of the aircraft tug. A steering handle 36 is pivotally mounted at the front end of the chassis 12 on pivot pins 38 extending through the side beams 14. The handle 36 consists of a pair of tubular members which are connected together by a chain catch plate 40 and a throttle control mounting plate 42 welded therebetween.

The engine 10 may be a conventional gasoline powered motor whose throttle is connected by a control cable 44 to a throttle control knob 46 mounted on mounting plate 42. The drive shaft of motor 10 is connected to a centrifugal clutch 48 of a conventional type whose output shaft is attached to a sprocket wheel 50. The sprocket wheel 50. The sprocket wheel 50 is connected to an input sprocket wheel 52 by means of a coupling chain 54. The input sprocket wheel 52 is attached to the input shaft of a gear box 56 which is supported on a mounting plate 57 and controlled by a gear shift 58. The output shaft of the gear box 56 is connected to an output sprocket 60. The direction of rotation of such output sprocket is controlled by the setting of gear shift 58 which is adjustable between neutral, forward and reverse positions to enable the aircraft tug to move in a forward or reverse direction. The output sprocket 60 is connected by a drive chain 62 to drive sprocket 64 mounted on the shaft 32 of rear wheel 28 so that such rear wheel serves as the drive wheel of the tug. Thus, the motor 10 is connected through clutch 48, coupling chain 54, gear box 56 and drive chain 62 to the rear wheel 28 of the aircraft tug so that such rear wheel is rotated by the motor to move such tug over the ground at a speed controlled by the setting of the throttle control 46. A shift control 65 may also be attached to the control mounting plate 42 and connected by a shift cable 67 to the gear shift 58 for gear box 56 in order to adjust such shift by such shift control.

The loading mechanism for pulling the nose wheel 66 of the airplane onto the wheel receiving portion of the tug chassis formed by the carrier pan 20, includes a tow line 68 which may be a link chain. The tow chain is secured to the wheel strut 70 of the nose wheel 66 by means of a hook 72 attached to one end of the chain. The tow chain 68 extends through a chain guide and locking device 74 mounted on the top of motor 10, and is temporarily secured in a narrow slot in the catch plate 40 on the pivoted handle 36. The chain guide and locking device 74 is shown in greater detail in FIG. 3 to include four sets of guide rollers including a small diameter roller 76 and a large diameter roller 78 mounted with two pairs of such rollers on an upper shaft 80 and two pairs of rollers on a lower shaft 81. The roller shafts are supported between a pair of spaced bracket arms 84 secured to the motor 10 by bolts 86. The large guide rollers 78 serve as guides to prevent the tow chain 68 from moving in a sideways direction while the small guide rollers 76 prevent such chains from moving in a vertical direction. Thus, the tow chain 68 is drawn through the guide mechanism between two sleeves 87 mounted on shafts 80 and 82 separating the four sets of guide rollers, when the handle 36 is pivoted in the direction of arrows 85 from the upper position shown in dotted lines in FIG. 1 to the lower position shown in solid lines. This causes the nose wheel 66 of the airplane to roll up onto the bottom portion 22 of the carrier pan 20 until such nose wheel rests against the stop plate 18 which slopes backward toward the carrier pan. It should be noted that the guide rollers and sleeve on the upper shaft 80 can be cast in one piece, as can the guide rollers and sleeve on the lower shaft 82.

A loading roller 88 is attached between a pair of projections extending from the bottom of the carrier pan at the rear end thereof to position such roller slightly above ground level so that it rotates in a direction of arrow 90 to aid in the movement of the nose wheel 66 onto the bottom portion 22 of the carrier pan. The loading roller is mounted flush with the upper surface of the bottom portion 22 of the carrier pan and materially reduces the force required to roll the nose wheel onto the aircraft tug by means of the handle lever 36. After the nose wheel 66 has been moved to the towing position in engagement with stop plate 18, a latch member 92 having an elongated slot therein is pivoted down in the direction of arrows 93 into the position shown in FIG. 1 in engagement with the large guide rollers 78 on the lower shaft 82. In this position the slot in the latch member engages a link of the tow chain and locks such tow chain against movement with respect to the guide rollers. The latch member 92 is pivotally attached between a pair of support arms 94 which are pivotally connected to the opposite ends of upper shaft 80 outside of bracket arms 84. Such latch member 92 is held in the locked position by the tension force of the tow chain.

In operating the towing apparatus, the carrier pan 20 is aligned with the wheel 66 of the airplane with the roller 88 in contact with such wheel. One end of the chain 68 is then attached to the wheel strut 70 and its other end positioned in the slot in the catch plate 40 on the handle 36 with the handle in its uppermost position and with minimum slack in the chain. With the latch member 92 disengaged from the chain, the handle 36 is normally moved to a lower position to pull the wheel 66 into the carrier pan 20. At the same time, the motor 10 operating through the gear box 56 and wheel 28 can be employed to drive the carrier pan under the airplane wheel 66 to the position shown in FIG. 1. The chain 68 is then pulled taut and the latch plate 92 engaged with the chain to lock the wheel 66 on the carrier pan. The motor 10 can then be employed to cause the tug to tow the airplane to a desired location while being guided by the handle 36. The latch plate 92 can then be again released from the chain and the motor 10 employed to drive the tug so as to move the carrier pan 20 from beneath the wheel 66.

It will be obvious to those having ordinary skill in the art that various changes may be made in the details of the above described preferred embodiment of the present invention without departing from the spirit of the invention. For example, a hand operated winch could be employed rather than the handle lever 36 to draw the tow chain 68 through the locking device 74. Therefore, the scope of the present invention should only be determined by the following claims.

I claim:
1. An aircraft tug for moving an airplane, comprising:
a wheeled carriage having a load carrying portion at one end thereof shaped to receive one of the wheels of said airplane by direct engagement therewith;
a loading roller rotatingly mounted on said one end of said carriage adjacent said load carrying portion;
motor means mounted on said carriage and connected to at least one of the wheels of said carriage to rotate said one carriage wheel so that it serves as a drive wheel to move said tug;
an elongated handle pivotally mounted on the other end of said carriage;
a tow chain for attachment to said airplane;
a plurality of guide rollers mounted on said carriage for guiding the movement of said tow chain;
a releasable catch member attached to said handle intermediate the ends thereof for securing said tow chain to said handle so that said chain may be pulled through said guide means by pivoting said handle from a raised position to a lowered position to roll said airplane up onto said carriage over said loading roller until one of the wheels of said airplane are positioned within said load carrying portion;
a latch member mounted on said carriage adjacent said guide means for locking said tow chain against movement of hold and airplane on said carriage in a towing position and for releasing said tow chain to enable loading and unloading of said tug; and
control means mounted on said handle for controlling the speed of said motor means.

2. An aircraft tug for moving an airplane, comprising:
a wheeled carriage having a load carrying portion at the rear end thereof shaped to receive one of the wheels of said airplane by direct engagement therewith;
a loading roller rotatingly mounted on said rear end of said carriage in alignment with the upper surface of the bottom of said load carrying portion;
motor means mounted on said carriage including an internal combustion engine connected through a gear box to at least one of the wheels of said carriage to rotate said one carriage wheel so that it serves as a drive wheel to move said tug;
an elongated handle pivotally mounted on the front end of said carriage;
a caster wheel rotatably mounted on said front end of said carriage to enable steering of said tug;
a tow chain for attachment to said airplane;
a plurality of guide rollers mounted on said carriage for guiding the movement of said tow chain;
a releasable catch member attached to said handle intermediate the ends thereof for securing said tow chain to said handle so that said chain may be pulled through said guide means by pivoting said handle from a raised position to a lowered position to roll said airplane up onto said carriage over said loading roller until one of the wheels of said airplane are positioned within said load carrying portion;
a latch member mounted on said carriage adjacent said guide means for locking said tow chain against movement to hold said airplane on said carriage in a towing position and for releasing said tow chain to enable loading and unloading; and
control means mounted on said handle including throttle means for controlling the speed of said engine and gear shift means for controlling the direction of rotation of said drive wheel.

(References on following page)

References Cited by the Examiner

UNITED STATES PATENTS

| | | | |
|---|---|---|---|
| 1,487,584 | 3/24 | McCarthy | 214—85 X |
| 1,636,273 | 7/27 | Baker | 254—191 X |
| 1,883,156 | 10/32 | Weaver | 214—505 |
| 2,248,080 | 7/41 | Hathaway | 214—85 X |
| 2,570,587 | 10/51 | Noone | 214—332 |
| 2,707,055 | 4/55 | Ellis | 214—84 X |
| 2,732,088 | 1/56 | Arnot | 214—332 |
| 2,783,025 | 2/57 | Scheidt | 254—191 |
| 2,799,408 | 7/57 | Overton | 214—84 |
| 2,877,913 | 3/59 | Arnot | 214—332 |
| 3,049,253 | 8/62 | Cabral | 213—332 X |

FOREIGN PATENTS 631,765   9/27   France.

HUGO O. SCHULZ, *Primary Examiner.*

MORRIS TEMIN, *Examiner.*

UNITED STATES PATENT OFFICE
CERTIFICATE OF CORRECTION

Patent No. 3,216,596                           November 9, 1965

Francis B. Perry

It is hereby certified that error appears in the above numbered patent requiring correction and that the said Letters Patent should read as corrected below.

Column 2, lines 43 and 44, strike out "The sprocket wheel 50."; column 3, line 8, for "81" read -- 82 --; column 4, line 31, for "of hold and" read -- to hold said --.

Signed and sealed this 2nd day of August 1966.

(SEAL)
Attest:

ERNEST W. SWIDER
Attesting Officer

EDWARD J. BRENNER
Commissioner of Patents